June 26, 1962     M. C. SELBY ETAL     3,041,533
R.F. VOLTMETER CALIBRATION CONSOLE
Filed May 19, 1959     4 Sheets-Sheet 1

INVENTORS
Myron C. Selby
Lewis F. Behrent
Francis X. Ries
BY
ATTORNEY

June 26, 1962 M. C. SELBY ETAL 3,041,533
R.F. VOLTMETER CALIBRATION CONSOLE
Filed May 19, 1959 4 Sheets-Sheet 3

AT VOLTMETER
REFERENCE
STANDARD AT1 - AT7

INVENTORS
Myron C. Selby
Lewis F. Behrent
Francis X. Ries
BY
Arthur Vinograd
ATTORNEY June 26, 1962   M. C. SELBY ETAL   3,041,533
R.F. VOLTMETER CALIBRATION CONSOLE
Filed May 19, 1959   4 Sheets-Sheet 4

INVENTORS
Myron C. Selby
Lewis F. Behrent
Francis X. Ries
BY Arthur Vinogred
ATTORNEY United States Patent Office 3,041,533
Patented June 26, 1962

3,041,533
R.F. VOLTMETER CALIBRATION CONSOLE
Myron C. Selby and Lewis F. Behrent, Boulder, and Francis X. Ries, Thornton, Colo., assignors to the United States of America as represented by the Secretary of Commerce
Filed May 19, 1959, Ser. No. 814,362
9 Claims. (Cl. 324—74)

This invention relates to electrical testing and particularly contemplates an improved calibrating system enabling the rapid and accurate calibration of instruments such as RF voltmeters on a practicable production line basis.

Calibration of radio frequency voltmeters generally requires a primary voltage standard and a cathode-ray tube or some type of thermistor bridge. (Radio frequency will hereafter be referred to as RF.) When employing a primary standard and comparison method of calibration, testing procedures are tedious, time-consuming and require the use of highly trained personnel. Each calibration test must be separately set up and for every different frequency range a separate primary standard and calibration procedure is usually required.

The demands of both industry and the military has required the establishment of a calibration center at the Boulder Laboratories of the National Bureau of Standards to facilitate instrument calibration on a production line basis. The present invention is employed at such calibration center to enable the rapid, accurate, and efficacious calibration of RF voltmeters.

In accordance with the principles of the present invention instead of a primary standard, a secondary standard in the form of the highly accurate NBS AT voltmeter is employed as described in U.S. patent application Serial No. 626,559 is employed filed December 5, 1956, by Myron C. Selby and Lewis F. Behrent, now U.S. Patent No. 2,933,684, dated April 19, 1960.

As described in the referred-to patent application, the AT voltmeter while not a frequency generator serves as a reference standard by accurately measuring RF power applied to it with a precision that exceeds many secondary reference standards. A series of such reference standards are conveniently mounted on a console and means are provided on the console for rapidly coupling the probe of the RF voltmeter to be calibrated selectively to any of the AT voltmeter reference standards. Power from a stabilized RF source is supplied through an automatic amplitude stabilizing means and a suitable overload circuit to the AT voltmeter standards. A simple D.C. millivoltmeter is used as an indicator of RF level.

It is accordingly an immediate object of the present invention to provide a calibrating mechanism which enables the rapid and accurate calibration of RF voltmeters over any desired frequency range.

It is an additional object of the present invention to provide an RF voltmeter calibrating device which dispenses with the need for expensive primary standards.

Still another object of the present invention is to provide an RF voltmeter calibrating device which is simple to use and does not require the skill generally necessary when conventional calibration techniques are implied.

A still further object of this invention is to provide a calibration system for calibrating RF voltmeters which uses a voltmeter as a reference standard for the RF voltmeter being calibrated.

Other uses and advantages of the invention will become apparent upon reference to the specification and drawings in which.

In accordance with the principles of this invention, a test circuit is provided including an RF power source, a plurality of RF voltmeters as reference standards and means for accurately indicating the RF voltage amplitude measured by the voltmeter.

Each of the voltmeter reference standards covers a particular voltage range and a plurality of such reference standards therefore provides a calibration range extending from 0.2 up to 500 volts. In accordance with the principles of the invention, means are provided for rapidly and selectively coupling the probe of a voltmeter to be calibrated to each of the reference standards. Means are provided for concurrently connecting the RF power source to energize the reference standard and the probe and for connecting the indicating means to the output of the selected reference standard. Comparison of the voltage measured by the reference standard with that of the voltmeter under test then provides a deviation error. By repeating the above procedure in connection with each of the standards, a calibration curve is obtained covering the entire range of the instrument under test.

Figure 2:
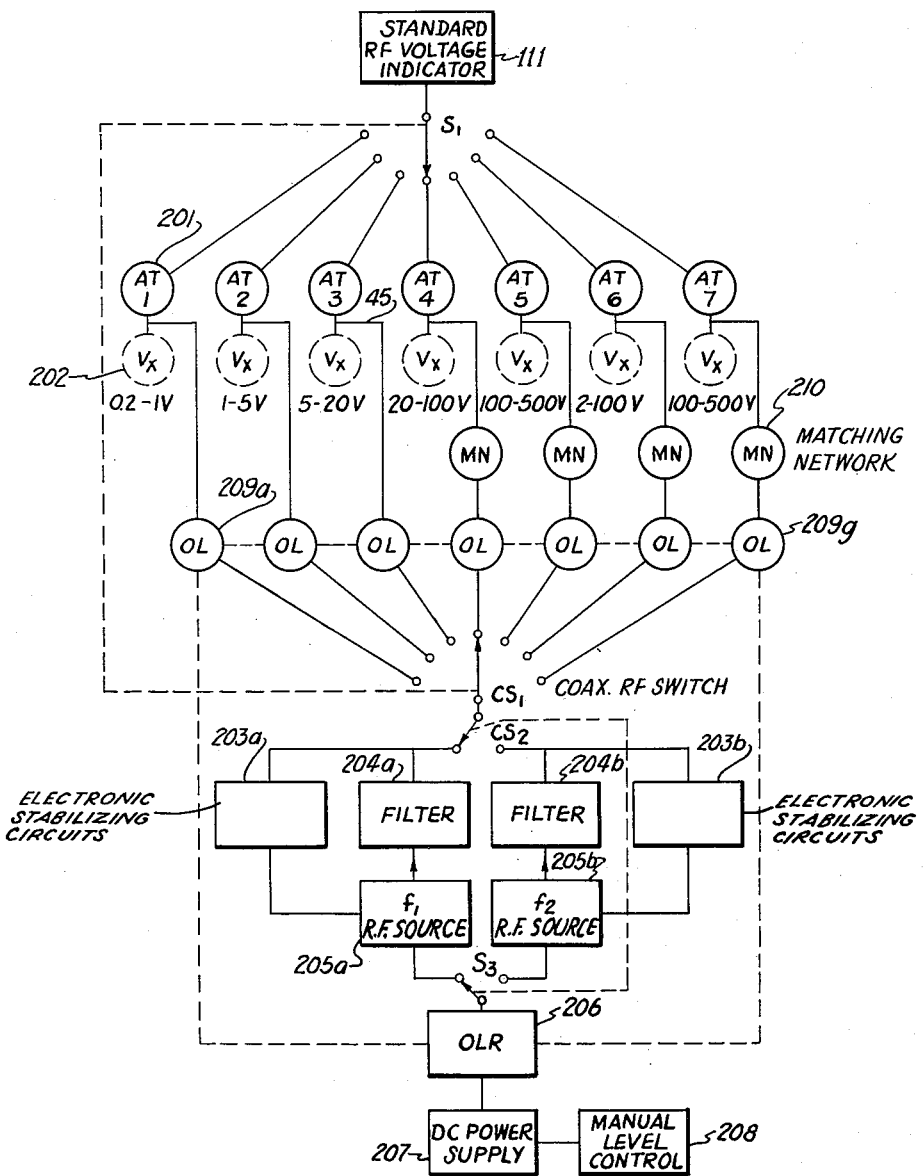
FIG. 2 is a block schematic diagram showing the general arrangement of components employed in connection with the present invention.

Referring first to the over-all schematic block diagram of FIG. 2, a plurality of AT voltmeters 201 designated as AT1–AT7 serve as secondary standards for the calibration system. The details of such AT voltmeters are described in the copending application referred to above. The RF voltmeter Vx designated as 202 to be calibrated is indicated in broken lines underneath each of the respective AT voltmeters AT1 through AT7 in order to represent its connection at each calibration range. In accordance with the symbolism indicated in FIG. 2, the 7 precision AT voltmeters cover a number of specific voltage ranges. Specifically, as indicated in FIG. 2, the voltmeter standard AT1 may cover a range of 0.2 to 1 volt, AT2 covers the range from 1 through 5 volts, etc. on up to AT7 which covers the range from 100 through 500 volts. It will therefore be clear from FIG. 2 that the particular voltmeter under test can be connected to the specific AT voltmeter standard corresponding to the calibrating range concerned.

Each of the standards AT1 through AT7 is connected through a switch $S_1$ to a standard RF voltage indicator 111 which may be in the form of a conventional D.C. millivoltmeter. Each of the AT voltmeters AT1 through AT7 are further connected as indicated in FIG. 2 to a respective overload circuit symbolically represented as 209a through 209g. These overload circuits together with overload relay 206 comprise a circuit as indicated by the broken line connections in FIG. 2, which is further detailed in FIG. 3 to be described. A switch $CS_1$ is provided to transfer RF energy from the RF source to the appropriate AT voltmeter circuit to be used in calibrating voltmeter Vx. $CS_2$ is a magnetically operated coaxial switch operated by switch $S_1$ and serves to connect the system including switch $CS_1$ to either one of the two RF frequency sources 205a or 205b providing frequencies $f_1$ or $f_2$ as shown in FIG. 2. The filters 204a, 204b correspond to either one of the two frequencies $f_1$, $f_2$ and in practice may comprise part of the RF source.

Each of the RF frequency sources 205a, 205b are in turn selectively energizable through a switch $S_3$ from a D.C. power supply 207 which is controlled by a manual level control 208.

Each of the RF sources 205a and 205b including a respective one of filters 204a, 204b and a respective one of impedance matching networks 210 are connected to the voltmeter standards AT1 through AT7 as diagrammatically outlined in FIG. 2. The purpose of the matching networks 210 are to match the AT voltmeter standards to the RF source which conveniently may be 50 ohms in order to prevent damage to the sources as a result of improper loading and also to obtain the maximum RF voltage at the AT voltmeter standards.

The overload circuits 209a through 209g which are shown as being interconnected with overload relay 206 in FIG. 2 are provided to prevent accidental damage to these secondary standards resulting from the possible application of RF voltages above the limits of the voltmeters. The overload relay 206 blocks any high voltage from the RF source in the event that the RF level applied to one of the secondary standards AT1 through AT7 goes beyond a safe limit.

A convenient D.C. commercial regulated power supply 207 is employed to excite the RF sources 205a, 205b. The RF level is maintained by adjusting the manual level 208 connected to D.C. power supply 207.

At 100 megacycles and higher frequencies, additional stabilization of the RF output level is necessary. Accordingly, suitable electronic stabilizing circuits 203a, 203b are provided to regulate the D.C. voltage applied to the power amplifier stage of either of the RF sources 205a, 205b in order to hold the amplitude constant at any predetermined RF level.

Figure 3:
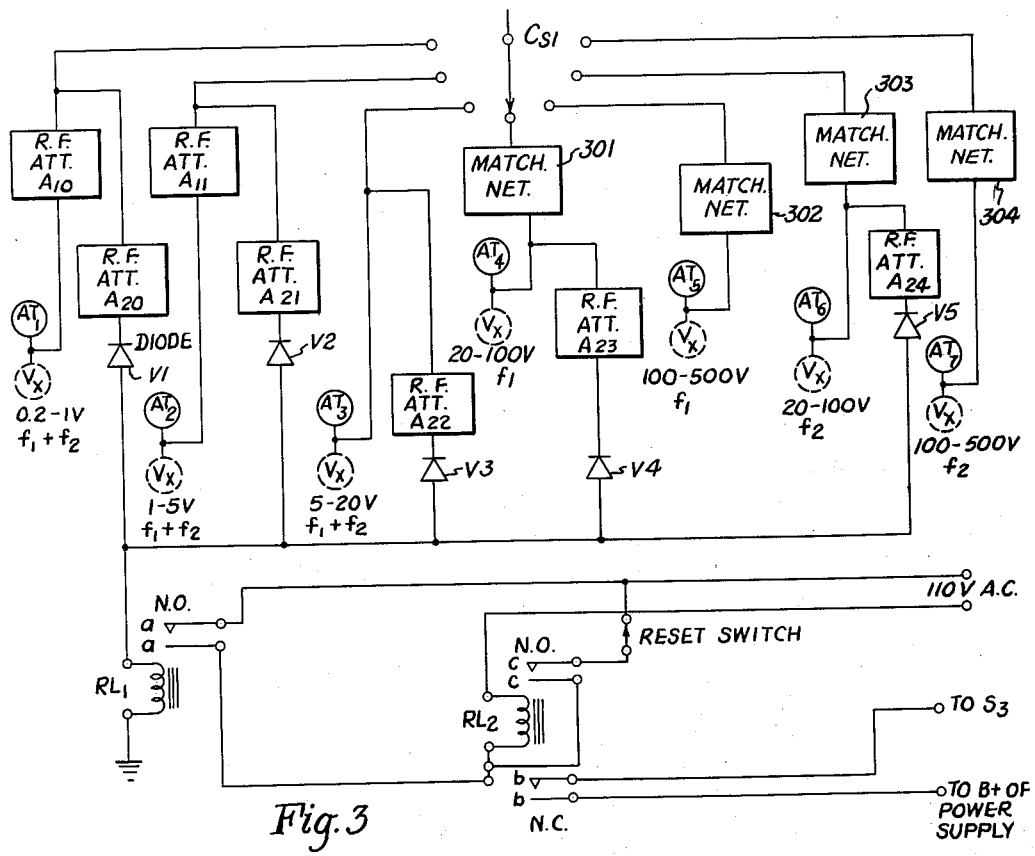
FIG. 3 is a diagrammatic illustration of the protective circuits employed in connection with the instrument of the present invention.

The overload protective circuit briefly referred to in connection with the block diagram of FIG. 2 as comprising elements 209a, 209g and 206 is further detailed in FIG. 3. FIG. 3 shows the connecting switch $CS_1$ described in connection with FIG. 2 together with the 7 contacts leading to each of the 7 respective AT voltmeter standards. These voltmeter standards AT1 through AT7 are similarly designated in FIG. 3 and the position of the voltmeter under test is designated as $V_x$ in relation to each of these standards as shown in dotted lines in FIG. 3 in the same manner as in FIG. 2.

The first three voltmeter reference standards AT1, AT2, and AT3 which cover the voltage ranges 0.2–1 v., 1–5 v., and 5–20 v., respectively are dissipative 50-ohm voltmeters used at both the $f_1$ and $f_2$ frequencies obtained from sources 205a, 205b in FIG. 2. The remaining four voltmeter reference standards AT4, AT5, AT6, and AT7 are single-frequency AT voltmeters employing fixed capacitive attenuators. Accordingly two of the latter group of voltmeters AT4 and AT6 are employed to cover the same voltage range (20–100 v.) but at the respective source frequencies $f_1$ and $f_2$ while the remaining two voltmeters AT5 and AT7 cover the voltage range 100–500 v. at frequencies of $f_1$ and $f_2$, respectively.

As shown in FIG. 3, matching network 301, 302, 303, and 304 are used to match the AT voltmeter AT4–AT7 to the 50-ohm RF sources 205a, 205b to prevent possible damage to the sources from improper loading and to obtain the maximum RF voltage at the voltmeter.

The protective circuits to be described are designed to block the RF voltage completely when the voltage applied to the reference standards AT1–AT7 exceeds 120% of its rated maximum.

Referring to FIG. 3, the contacts of an overload relay RL–1 are connected to a 110-volt A.C. source through the coil of a second relay RL–2. The high voltage output line of the D.C. power supply 207 indicated in connection with FIG. 2 is connected through the contacts of switch $S_3$ in FIG. 2 to a pair of normally closed contacts b—b associated with the second relay RL–2 as shown in FIG. 3. The relay RL–2 also includes a pair of normally open contacts c—c one of which is connected through a reset switch to one terminal of the 110-volt A.C. source.

It will be clear that energization of the relay RL–1 will close its normally opened contacts a—a to thereby energize the coil of the second solenoid RL–2. When the coil of the relay RL–2 is energized its normally opened contacts c—c will close to establish a hold circuit for the coil of relay RL–2. Energization of relay RL–2 will also open the normally closed contacts b—b thereby disconnecting the output of the D.C. power supply 207 from the RF sources 205a, 205b of the AT voltmeter standards thereby removing the RF voltage from the AT voltmeter standards.

The overload circuit also includes a plurality of germanium crystal diodes V1–V5. The purpose of these diodes is to measure the RF voltage applied to the reference standards. One such crystal diode is associated with each of the AT voltmeter standards with the exception of the standards for the top voltage levels. These crystals therefore function to monitor the RF voltage applied from the RF source. Since the diodes V1–V5 are connected to the coil of overload relay RL–1, the relay will be energized when the RF voltage exceeds a predetermined level. The circuit shown in FIG. 3 is so arranged that when the level reaches 120% of the particular standard maximum rated level, the overload relay RL–1 will be activated to produce the effects as above described thereby removing the high D.C. voltage from the RF voltage source and instantaneously reducing the RF voltage to zero.

The reset switch shown in FIG. 3 when activated will break the hold circuit of the relay RL–2 to reset the overload protection circuit. Such switch is actuated co-jointly with the manual level control shown in FIG. 2 so that returning of the manual level control to zero, an operation which would occur should an overload condition be created, will automatically operate the reset switch thereby restoring the relay described in connection with FIG. 3 to the original condition.

A plurality of attenuators designated in FIG. 3 as A10, A11, A20, A21, A22, A23, and A24 are further included in the safety circuit to enable operation of the reference standards within minimum and maximum levels with maximum stability and at safe plate dissipations of the RF source output tubes. Since the output of the reference standards is reduced by dropping the plate and screen operating voltages, the latter must be kept above a certain minimum value.

To facilitate rapid calibration of the voltmeter at different ranges, each console is equipped with a plurality of AT voltmeter reference standards covering a range of from 0.2 volt at 12 different frequency ranges between 30 kilocycles and 700 megacycles. Provision is made for rapidly connecting the probe of the voltmeter to be calibrated to any selected one of such standards.

Specifically, the table portion of the console 100 (FIG. 1) is provided with an elongated RF voltmeter coupling plate 40. The AT voltmeter reference standards AT1 through AT7 previously identified in connection with FIG. 3 are partially visible in FIG. 1. These reference standards are detachably connected underneath and along the length of the coupling plate.

Figure 4:
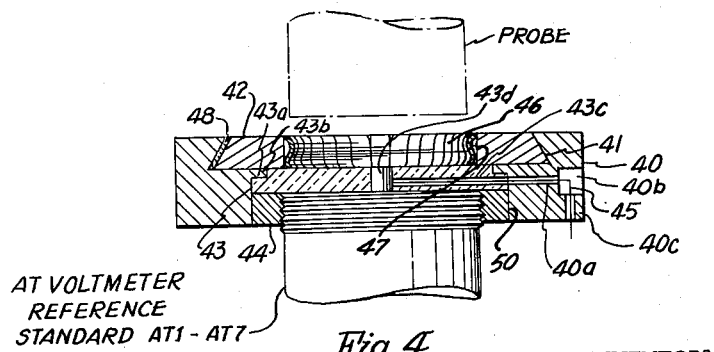
FIG. 4 is a detailed sectional view of the coupling mechanism employed for rapidly connecting an RF probe to an AT voltmeter standard taken on line 4—4 of FIG. 5.
Figure 5:
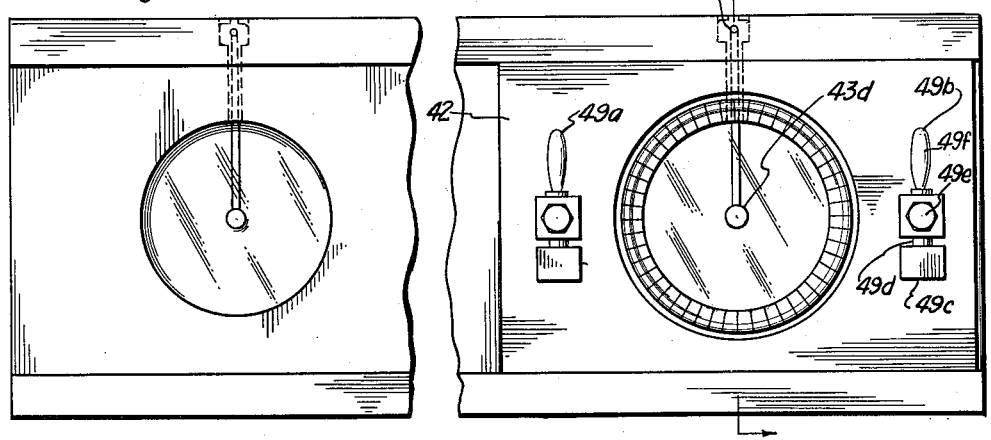
FIG. 5 is a top view of the means for connecting an RF probe to the AT voltmeter standards.

The construction of such coupling plate together with the related standards and the means for coupling the probe of the instrument to be calibrated to these standards is shown in greater detail in FIGS. 4 and 5.

Referring to FIG. 4 which is a cross-sectional view taken on line 4—4 of FIG. 5, the coupling plate 40 comprises an elongated plate having a dovetailed guide portion 41 adapted to slidably receive a probe carrier 42 to be described. FIG. 4 also shows the means provided for retaining each of the AT voltmeter reference standards in the coupling plate. Specifically, the base of the coupling plate as shown in FIG. 4 is provided with a plurality of orifices 50 spaced lengthwise of the coupling plate as viewed in FIG. 1. The upper end of each of these orifices is closed by a window 43 comprising a disc of non-conducting high quality dielectric material such as Rextolite, for example. The plastic window 43 includes a shouldered portion 43a which abutts against a ledge 43b formed in the coupling plate. A sleeve 44 is inserted in the orifice in the coupling plate and securely holds the plastic window 43 in a position whereby the top surface of the window is flush with the bottom surface of the dovetailed slot in the coupling plate. A small mandrel 43d of conducting material is inserted in the center of the window disc 43.

To provide electrical contact with such conducting mandrel, a hole is bored radially through the window disc 43 to provide a passageway 43c between the conducting mandrel and the periphery of the window. A portion of the coupling plate is also transversely bored in alignment with the radial passageway 43c to form a passageway 40a to the exterior edge of the coupling plate. The passageway 40a terminates in a counterbore 40b in the coupling plate and a second lateral passageway 40c is provided. By virtue of such construction a conductor 45 may readily be inserted in the passageways 43c and 40a and 40c. The conductor 45 forms part of the circuit connections to the RF power source as shown in FIG. 2. It will be apparent that such arrangement permits the application of electrical energy to the conducting mandrel 43b located in the center of the plastic window 43.

The referred-to sleeve 44 is internally threaded as shown in FIG. 4 to receive one of the previously identified AT voltmeter standards. The casing of such voltmeter standard may be suitably threaded as shown in FIG. 4 so as to be threadingly mounted in the sleeve 44. When AT standards of different sizes are employed suitable filler or adaptor rings may be placed within the sleeve 44 to accommodate the particular diameter standard being used.

When the AT voltmeter reference standard is inserted in the coupling member, the referred-to conducting mandrel 43d will provide electrical contact with an appropriate electrical element in the AT voltmeter reference standard and an electrical circuit will thereby be completed through the conducting spoke 45 and to the power source described in connection with FIG. 2.

The probe of the instrument to be calibrated is schematically represented by broken lines in FIG. 4. To provide a convenient means of rapidly connecting the probe to each of any selected one of the AT voltmeter reference standards, a probe carrier 42 is slidably mounted in the previously identified dovetailed slot 41 formed in the coupling plate. The carrier 42 as seen in both FIGS. 4 and 5 comprises a plate conforming to the shape of the dovetailed passageway in the coupling plate. The carrier is provided with an orifice 46 corresponding to the size of the orifices 42 in the coupling plate.

In order to conveniently receive a probe the periphery of the orifice 46 is provided with an annular liner 47 of springy material. Such liner may be generally cylindrical in form as shown in FIG. 4 and is suitably slotted to provide a multitude of springy fingers which are adapted to frictionally grip the periphery of the probe when it is inserted in the orifice 46 in the probe carrier. To accommodate different size probes suitable adaptor rings (not shown) are employed to match the probe with the orifice 46.

To provide sufficient frictional engagement between the slidable probe carrier 42 and the coupling plate a leaf spring 48 is provided between one edge of the carrier plate and the groove in the coupling plate.

The carrier plate may also be provided with clamping arms 49a, 49b as shown in FIG. 5 to securely hold the probe in place on the carrier. Such clamping arms comprise dogging elements 49c secured by a leaf spring 49d to a pivot 49e. A handle 49f enables turning of the dogging element 49c in a direction so that it will abutt against and grip a flange (not shown) which may be provided on the probe.

It will be apparent from the above description that the probe of the instrument to be tested can rapidly be indexed by means of the carrier 42 to a position in registry with each of the 7 AT voltmeter standards provided in the coupling plate. The referred to conducting mandrel 43d forms a contact which is exposed on the opposite face of window 43 and makes electrical contact with the inner conductor of the voltmeter probe as well as with the voltmeter reference standard.

Figure 1:
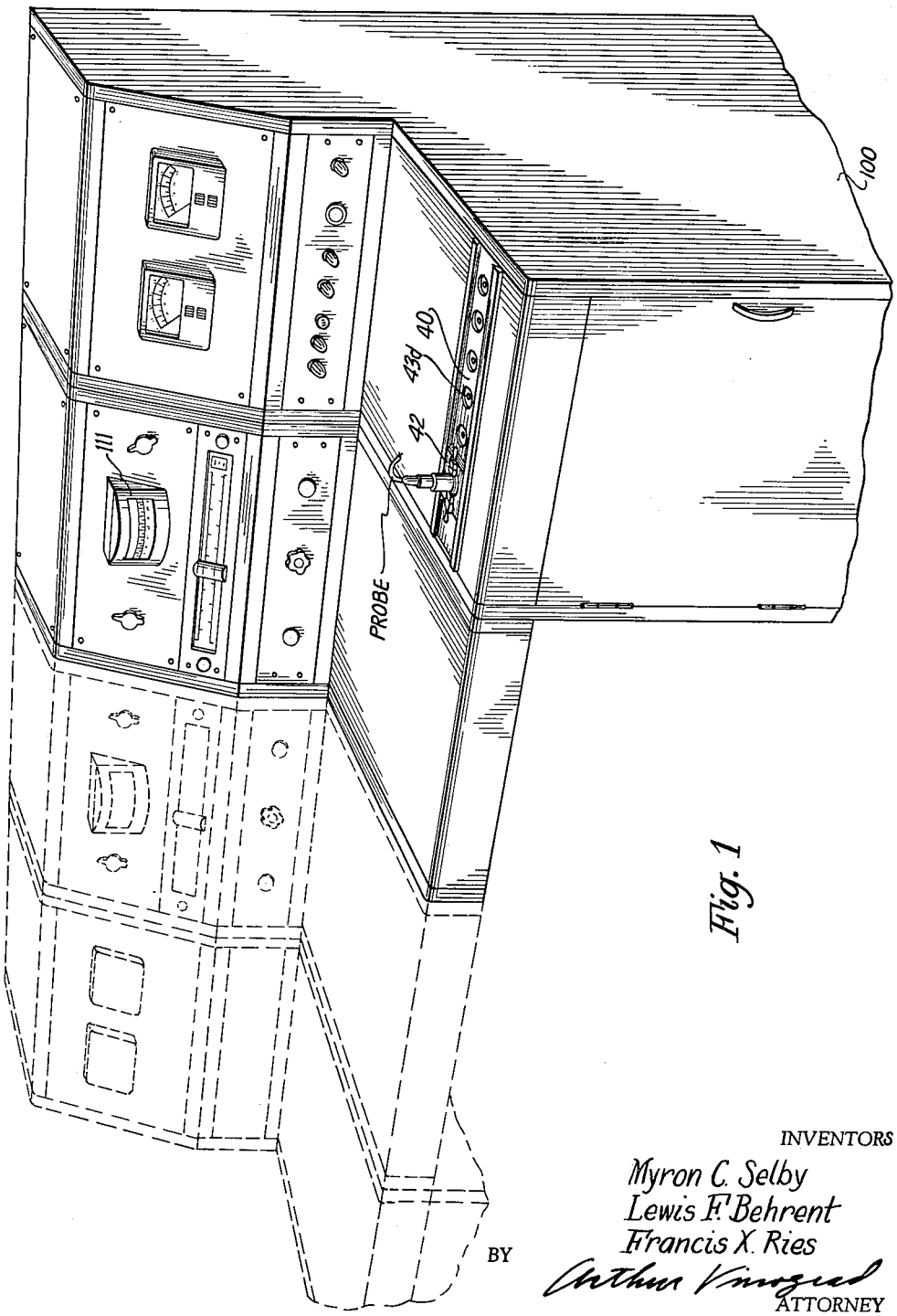
FIG. 1 is an over-all view of the RF voltmeter calibrating console showing the arrangement of controls, the position at the AT voltmeter standards and an RF probe in calibrating position.
Figure 6:
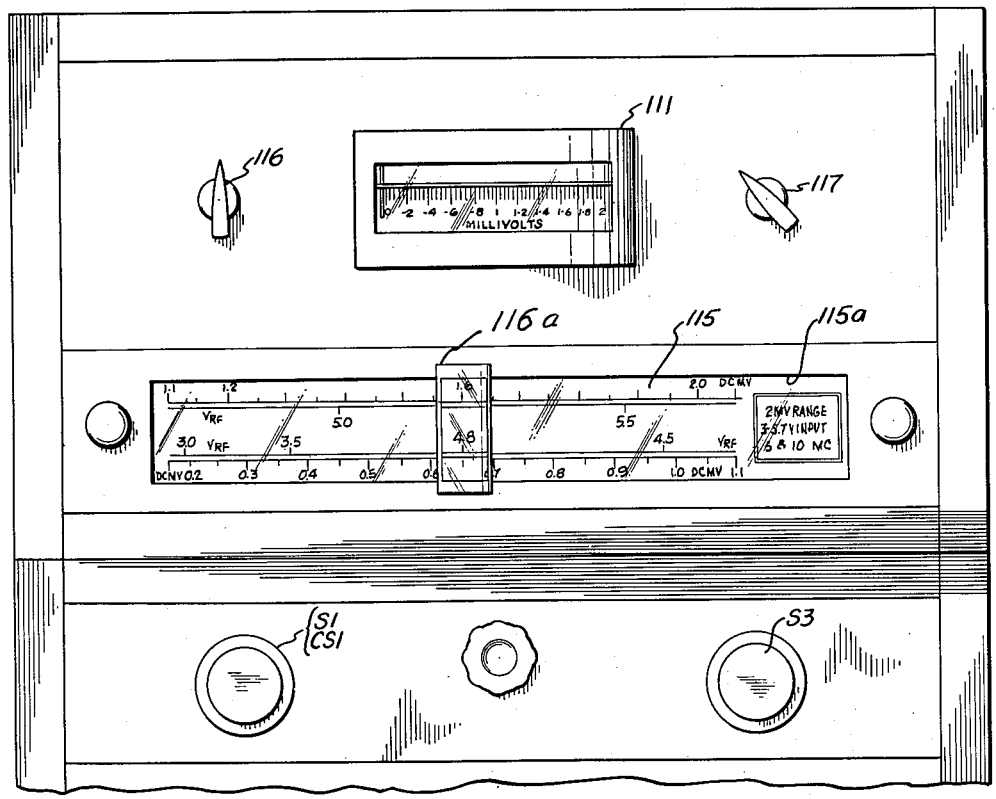
FIG. 6 is a more detailed view of a portion of the calibrating console shown in FIG. 1.

FIG. 6 shows a portion of the console of FIG. 1 in greater detail. The RF voltmeter indicator 111 described in connection with the circuit of FIG. 2 is mounted on a panel of the console in a position convenient for observation.

A conversion scale 115 is mounted below the indicator 111 to permit rapid conversion of the readings of millivoltmeter 111 into RF voltage values. A plurality of interchangeable scales are carried in a recess 115a formed in the panel so that any desired voltage range can be selected. A magnifying slide 116a is provided to facilitate reading of the scale graduations.

The control knobs 116, 117 adjacent millivoltmeter 111 control the polarity and the reading range respectively of the meter.

The control knobs for the coaxial RF switches $CS_1$ and $CS_2$ described in connection with FIG. 2 are indicated in FIG. 6 as well as the control knob for switch $S_3$, which selects the frequency source.

The manner of using the apparatus of this invention is believed obvious from the above description. Briefly, the voltmeter to be calibrated is placed on the table of the console as viewed in FIG. 1 so that its meter scale will be readily visible. Only the probe portion of an RF voltmeter is shown in FIG. 1 for purposes of clarity.

The probe is shown in FIG. 1 connected to the probe carrier plate 42 (FIGS. 4 and 5) and, as is obvious from FIG. 1, the probe can therefore be indexed into a position of registry with any one of the windows 43 corresponding to a reference standard of particular range.

As described in connection with FIGS. 4 and 5, the conductor 45 forms part of the energization circuit which connects the RF power to the reference standards AT1–AT7. Since such power is supplied to the conducting mandrel 43d in each of the windows, and since such mandrel provides electrical contacts on each orifice of the window, it will be clear that the probe of the instrument being calibrated and the particular reference standard with which the probe is in registry will be concurrently energized when selector switch $CS_1$, $S_1$ (FIGS. 2 and 6) has been correspondingly set.

Referring to FIG. 6, since the millivoltmeter 111 indicates the amplitude measured by the highly precise AT voltmeter AT1–AT7, by observing meter 111 concurrently with the reading of the meter under test, any deviation error is quickly ascertained. By rapidly indexing the probe of the meter under test to each of the seven ranges represented by windows 43 (FIG. 1) and repeating the above procedure for each position, a calibration curve is obtained covering a wide voltage and frequency range.

It will be apparent that the embodiments shown are only exemplary and that various modifications can be made in construction and arrangement within the scope of invention as defined in the appended claims.

What is claimed is:
1. A system for calibrating a voltmeter over a selected voltage range comprising: a test circuit including a power source, a plurality of voltmeter reference standards, each corresponding to a different portion of said voltage range and means for selectively indicating the output of each of said reference standards; a probe of an instrument to be calibrated; a coupling device including a first plate having a plurality of windows spaced therein; means for securing the input of each of said reference standards to a first side of said first plate in registry with a respective one of said windows; a probe carrier movably mounted on the side of said first plate opposite said first side, said probe carrier including a second plate having an opening therein and means for detachably holding said probe in said opening; means for selectively positioning said opening over a desired one of said windows; and means for connecting the input of the reference standard associated with each window and the input of said probe in parallel with the output of said power source.

2. The invention of claim 1 in which said test circuit includes overload protective circuit means connected between said power source and each of said voltmeter reference standards, first switch means for selectively coupling said indicating means to the output of each of said reference standards and second switch means for selectively connecting each of reference standards to said power source, and means interconnecting said first and second switch means for operation in unison.

3. The invention of claim 2 in which said overload protective circuit includes detecting means for measuring the magnitude of the signal applied to each of said reference standards, a relay connected to said detecting means, said relay being operative in response to a selected output of said detecting means, a control circuit connected to said relay including means responsive to the operation of said relay for inactivating said power source, and means for connecting said last-mentioned means to said power source.

4. The invention of claim 3 in which said power source includes an adjustable means for varying the amplitude of the power and including a reset switch in the circuit of said relay, and means connecting said adjustable means to said reset switch whereby varying the amplitude of the output of said power source will function to concurrently actuate said reset switch.

5. A system for calibrating a voltmeter over a selected voltage range comprising: a test circuit including a power source, a plurality of voltmeter reference standards, each corresponding to a different portion of said voltage range and means for selectively indicating the output of each of said reference standards; a probe of an instrument to be calibrated; a coupling device including a plate having a plurality of windows spaced therein, each of nonconductive material, a first member of conductive material mounted through each of said windows to provide a first and second contact on opposite faces thereof, a second member of conductive material mounted in each window and extending radially therein to the periphery of the window, each second member being connected to a respective first member; means for selectively connecting each second member to the output of said power source; means for securing each of said reference standards to a first side of the plate in said coupling device in registry with the first contact of a respective one of said windows; a probe carrier movably mounted on the side of said plate opposite said first side, said probe carrier including a member having an opening therein and means for detachably holding said probe in said opening; and means for selectively positioning said opening over the second contact of a desired one of said windows.

6. A system for calibrating a voltmeter over a selected voltage range comprising: a voltmeter reference standard, means for indicating the output of said reference standard, a coupling device including a plate having a window of nonconductive material positioned therein, a first member of conductive material mounted through said window to provide a first and second contact on opposite faces thereof, a second member of conductive material mounted in said window and extending radially therein to the periphery of the window, said second member being connected to the first member, a power supply means for connecting said second member to the output of said power supply, means for securing said reference standard to the first side of the plate in said coupling device in registry with the first contact on said window, a probe of an instrument to be calibrated, a probe carrier movably mounted on the side of said plate opposite said first side, said probe carrier including a member having an opening therein, said opening being positioned over the second contact in said window, and means for detachably holding said probe in said opening.

7. The invention of claim 6 including detecting means for continually measuring the magnitude of the voltage applied to said reference standard, a control circuit responsive to a selected output of said detecting means for inactivating said power supply, and means for connecting said last-mentioned means to said power supply.

8. A system for calibrating a voltmeter over a selected voltage and frequency range comprising: a voltmeter reference standard, means for indicating the output of said reference standard, a probe of an instrument to be calibrated, a power source, means for connecting the input of said probe and said reference standard in parallel with the output of said power source, detecting means for continually measuring the magnitude of the voltage applied to said reference standard, a control circuit responsive to a selected output of said detecting means for inactivating said power source, and means for connecting said last-mentioned means to said power source.

9. An arrangement for coupling the inner conductor of a first and second probe to a power source comprising: a coupling plate having at least one window positioned therein, said window being of nonconductive material, a first conductor positioned through said window to provide a first and second contact on opposite faces thereof, a second conductor connected to said first conductor and extending radially in said window to the periphery thereof, means for connecting said power source to the end of said second conductor located in the periphery of said window, a probe carrier slidably mounted in said coupling plate, said carrier having an opening, means for mounting said first probe in said opening in such a manner that its inner conductor engages said first contact, and means for mounting said second probe in said coupling plate in such a manner that its inner conductor engages said second contact.

References Cited in the file of this patent

UNITED STATES PATENTS

| 1,987,564 | Owens | Jan. 8, 1935 |
| 2,192,826 | Cole | Mar. 5, 1940 |
| 2,434,534 | Alford | Jan. 13, 1948 |
| 2,588,558 | Mosimann | Mar. 11, 1952 |
| 2,769,928 | Emker | Nov. 6, 1956 |
| 2,949,522 | Glueckstein et al. | Aug. 16, 1960 |

OTHER REFERENCES

"A Versatile Semi-Portable Calibrating Bench for Electrical Instruments," article in Instruments, vol. 18, November 1945, pages 74–76.